United States Patent [19]

Halter

[11] E Re. 29,113

[45] Reissued Jan. 11, 1977

[54] TRIANGULAR PIEZOELECTRIC TRANSDUCER FOR RECORDING VIDEO INFORMATION

[75] Inventor: Jerome Barth Halter, Indianapolis, Ind.

[73] Assignee: RCA Corporation, New York, N.Y.

[22] Filed: Sept. 12, 1975

[21] Appl. No.: 612,737

Related U.S. Patent Documents

Reissue of:

[64] Patent No.: 3,865,997
Issued: Feb. 11, 1975
Appl. No.: 351,599
Filed: Apr. 16, 1973

[30] Foreign Application Priority Data

Apr. 19, 1972 United Kingdom ..... 18039/72

[52] U.S. Cl. ..... 358/128; 179/100.41 P; 179/100.4 C; 310/9.6; 310/9.5; 310/8.2; 310/8.3

[51] Int. Cl.[2] ..... G11B 3/00; H04R 17/04; H01V 7/00

[58] Field of Search ..... 178/6.6 R, 6.6 DD, 6.6 B, 178/6.6 A; 179/100.41 P, 100.41 B, 100.4 C; 274/37, 46 B; 310/9.6, 9.5, 8.2, 8.3

[56] References Cited

UNITED STATES PATENTS

| | | | |
|---|---|---|---|
| 1,444,147 | 4/1921 | Zaayer | 274/37 |
| 1,525,823 | 2/1925 | Nicolson | 179/100.41 P |
| 2,160,793 | 1/1938 | Dally | 179/100.41 P |
| 2,170,318 | 4/1937 | Cady | 179/100.41 P |
| 2,286,178 | 2/1940 | Kornei | 179/100.41 P |
| 2,513,269 | 7/1950 | Bauer | 179/100.41 P |
| 2,540,412 | 2/1951 | Adler | 179/100.41 P |
| 3,652,809 | 3/1972 | Dickopp | 179/100.41 P |
| 3,691,318 | 9/1972 | Schuller | 179/100.41 P |
| 3,805,100 | 4/1974 | Klemp | 179/100.41 P |

*Primary Examiner*—Bernard Konick
*Assistant Examiner*—Alan Faber
*Attorney, Agent, or Firm*—Eugene M. Whitacre; William H. Meagher; Dilip A. Kulkarni

[57] ABSTRACT

A cutterhead assembly suitable for forming a topographic signal-representative pattern in a recording medium such as a disc is constructed with non-parallel external surfaces so as to provide a response relatively free of undesired resonant modes over a relatively wide frequency range. The cutterhead includes a cutting stylus supported in a stylus mount. The stylus mount and therefore the stylus are driven by a piezoelectric element which is mounted on a supporting pedestal. A resilient mounting means is utilized to fasten the supporting pedestal to a mounting bracket.

14 Claims, 2 Drawing Figures

TRIANGULAR PIEZOELECTRIC TRANSDUCER FOR RECORDING VIDEO INFORMATION

Figure 1:
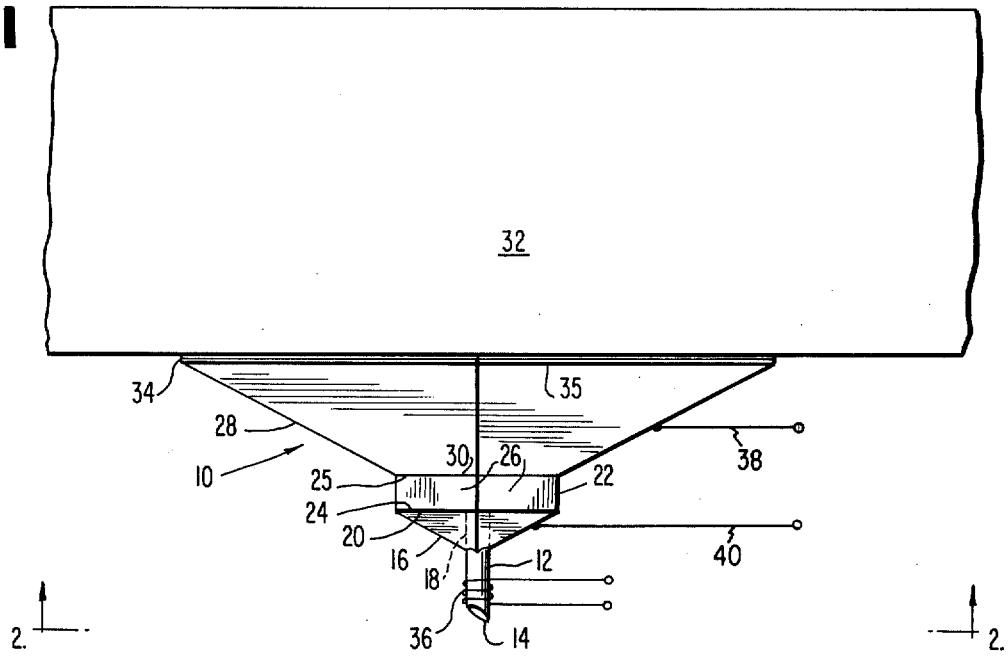

Matter enclosed in heavy brackets [ ] appears in the original patent but forms no part of this reissue specification; matter printed in italics indicates the additions made by reissue.

This invention relates to cutterheads suitable for forming topographic signal-representative patterns on a recording medium such as a disc and more particularly to a cutterhead suitable for providing a substantially uniform, signal-responsive cutting stylus displacement over a relatively wide band of frequencies such as may be employed in a video disc system.

Cutterheads are known for topographically recording signal information, particularly in the field of recording audio phonograph records. In the recording process of audio records, a topographic pattern, representative of audio signal information, is cut with a cutterhead in a laquer-coated disc. The laquer-coated disc, including the topographic information is then replicated, for example, in nickel. This nickel replica has topographic information formed in opposite contour from that on the laquer-coated disc and may be utilized to stamp audio records of, for example, vinyl or thermoplastic material.

Cutterheads utilized for recording audio signals typically have a relatively flat frequency response to about 20 kilohertz and thereafter typically possess undersirable resonant modes. This frequency response is suitable for recording audio records in real time, i.e., the same time as utilized for playing back the record, but is unsuitable for real time recording of video signals having a much wider bandwidth, for example, of the order of 4 megahertz. If it is desired to record video signals with an audio cutterhead, the video information has to be arranged such that the highest frequency component, e.g., 4 megahertz, is translated to the range of capability of the cutter, e.g., 20 kilohertz. This frequency translation, i.e., 4 megahertz to 20 kilohertz, may be accomplished by photographically recording the desired picture or video information on motion picture film and then operating the film at a greatly reduced speed, for example, 1/200 of the normal film speed, while electronically scanning and detecting the information on the film at a similar reduced speed. The signal information derived at the detector is then effectively translated in frequency such that the detected signal frequencies are 1/200 of the frequency values which would be detected at normal film and scan speeds.

If the video signal to be recorded is slowed down to 1/200 of real time, it would take approximately 100 hours of recording time to record 30 minutes of real time video signal information. This exceptionally long recording time is impractical and costly for producing discs recorded with video information. It is, therefore, desirable to decrease the recording time as much as possible. A decrease in recording time may be realized by increasing the bandwidth of the cutterhead. For example, if the bandwidth of the cutterhead is increased from 20 kilohertz to 200 kilohertz, the recording time may be proportionally decreased from 1/200 of real time to 1/20 of real time. It is, therefore, desirable to provide a cutterhead having as wide a frequency response as possible in order to appropriately decrease recording time.

The resonant modes of known cutterheads, which serve to limit their frequency responses, are related at least in part to the physical dimensions of the devices and their mounting structures. That is, where dimensions of the structure correspond to ½ or ¼ wavelengths of signal information passing through or coupled to such structure an undesired resonant condition may be produced, thereby preventing the desired uniform response of the cutterhead to signals at or near that wavelength or frequency. While reducing the dimensions of a cutterhead serves to increase such resonant frequencies and thereby offers the prospect of higher frequency response, a limit is reached in that structural stability, heat dissipation, and motion of the cutting stylus with respect to its mount (and therefore depth of cut of a groove) are limited with small structures.

In accordance with the present invention, a cutterhead suitable for forming a topographic signal-representative pattern in a disc and having a relatively wide bandwidth includes a stylus mount having a base region and a region adapted for receiving a cutting stylus. A piezoelectric element having first and second opposing sides is rigidly coupled between the stylus mount and a pedestal having first and second opposing sides of different surface area. The first side of the piezoelectric element is adjacent to the first side of the pedestal and the second side of the piezoelectric element is adjacent to the base of the stylus mount. The pedestal, piezoelectric element and stylus mount are formed to provide a structure having anti-parallel external surfaces. Means are provided for applying electrical signals to the piezoelectric element and additional means are provided for mounting the second side of the pedestal to a mounting bracket.

Figure 2:
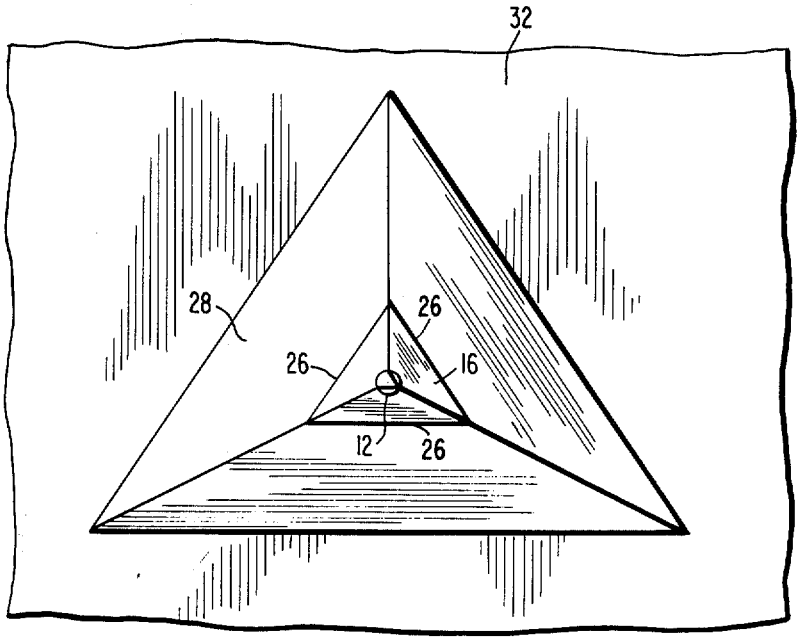

FIG. 1 is a side elevation of the video disc cutterhead of this invention with electrical connections shown schematically; and FIG. 2 is a bottom plan view looking in the direction of line 2—2 of FIG. 1 with the electrical connections removed.

With reference to the drawings, a cutterhead assembly 10 includes a cutting stylus 12 of a hard, rigid material (such as diamond) having a stylus point 14. The stylus 12 has a shank diameter proportioned with respect to its shank length to provide a desired structural strength.

Stylus 12 is mounted in a stylus mount 16 which, in the illustrated arrangement is of triangular truncated pyramidal shape. Stylus mount 16 includes a central mounting hole 18 for mounting the stylus rigidly therein and a base 20 for attachment, for example, by means of a combination of conductive and non-conductive epoxy cement, to one face of a piezoelectric element 22. Conductive epoxy cement is utilized to provide an electrical connection between stylus mount 16 and piezoelectric element 22, while the non-conductive epoxy is utilized to provide structural strength. The stylus mount 16 is constructed of material that is relatively inelastic and low in density as will be explained below.

Electrical signals representative of information to be recorded are applied to piezoelectric element 22 by means of electrical connections 38 and 40. Piezoelectric element 22 is responsive to the electrical signals and operates in the $d_{33}$ mode, i.e., the displacement of the stylus 12 is in the same direction as the applied electric field. The electric field is therefore applied between the parallel faces 24, 25 of the element 22 in the direction of desired motion of the stylus 12. The piezoelectric element 22 has sides 26 which are triangular shaped in plan conforming with the shape of a supporting pedestal base 28 upon which it is mounted. Although the piezoelectric element 22 is illustrated with vertical sides (see FIG. 1), the sides of this element also may be sloped to form a truncated structure similar in shape to pedestal 28. Typical piezoelectric materials which are suitable for element 22 are of lead zirconium titanate type and are available from Clevite Corporation as PZT-8 or PZT-4 materials. Supporting pedestal 28 includes a surface 30 rigidly coupled to parallel surface 25 of element 22 by a combination of conductive and non-conductive epoxy cement as utilized for attaching element 22 to stylus mount 16. Pedestal 28 is formed in a truncated triangular pyramidal shape having a triangular cross-section similar in shape to the cross-sections of both piezoelectric element 22 and stylus mount 16.

The cutterhead assembly is supported from a mounting bracket 32 typically formed of aluminum or steel and is decoupled from this mounting bracket by means of damping material 34 positioned between base 35 of the supporting pedestal 28 and the mounting bracket 32. Damping material 34 may include relatively thin layers of pliable material separated by layers of rigid material such as Kapton available from the Dupont Corporation. The thin layers of pliable material may be of silicon rubber or cellulose of the type manufactured by American Viscose Company, Markus Hook, Pa., under the name Viscoloid. Damping material at base 35 of support pedestal 28 inhibits reflection of waves generated by piezoelectric element 22 within pedestal 28.

A heating element 36 is wrapped about the tip of stylus 12 and aids in the cutting of a signal representative topography in a lacquer-coated disc (not shown) by heating cutting stylus 12. Electrical connection 40 is coupled to pedestal 28 for providing, along with connection 38, the required electrical signals to piezoelectric element 22. In constructing the illustrated apparatus, a stylus mount 16 which is relatively inelastic, i.e., having a high Young's modulus E, and a low density $\rho$ is desired in order to precisely transmit the displacement of the piezoelectric element 22 to stylus 12 over a wide frequency range. The displacement response of stylus 12 with respect to the base 20 is governed by the propagation velocity of a displacement applied at base 20 which travels through the material of mount 16 to stylus 12. A high propagation velocity C in the material of stylus mount 16 allows stylus 12 to follow relatively high frequency motion of base 20. The propagation velocity C is given by the equation $C = \sqrt{E/\rho}$. Hence, materials having a high propagation velocity C have a large E to $\rho$ ratio, e.g., a high Young's modulus and low density. Materials such as aluminum, magnesium, beryllium or sapphire are relatively inelastic, have low density and provide good performance when used for the stylus mount 16. A large E provides rigid stylus-PZT coupling.

In order to obtain maximum stylus displacement in response to electrical excitation of piezoelectric element 22, it is necessary to maintain surface 25 of piezoelectric element 22 as stationary as possible allowing parallel surface 24 to provide essentially all the displacement. In order to maintain surface 25 of piezoelectric element 22 as stationary as possible, surface 30 of pedestal 28 should present a relatively high mechanical impedance to the motion of element 22. This is accomplished by making the supporting pedestal 28 of a material having a relativey high density $\rho$ and a relatively high velocity of propagation C. This provides a large specific mechanical impedance $\rho \times C$. Since the propagation velocity C is proportional to the square root of the Young's modulus E, a material having a high Young's modulus E is desirable as well as one having a relatively high density $\rho$. Steel or tungsten are suitable materials. Although tungsten gives a slightly greater bandwidth, it is much more difficult to fabricate. A steel pedestal has been found to give suitable performance, although other materials that are substantially inelastic and have a relatively high density can be used.

The relatively large size of pedestal 28 further provides a good heat sink for the relatively small piezoelectric element making it possible to operate the cutterhead assembly 10 to a relatively high signal level without encountering depolarization or thermal runaway of the piezoelectric element 22.

As can be seen with reference to FIGS. 1 and 2, the external surfaces of the assembled cutterhead are in the general form of a triangular pyramid and as such, alleviate parallel transmission paths for propagating waves between points on different external surfaces. Hence, the chances for large resonances to occur within the cutterhead structure are minimized at frequencies where ½ and ¼ wavelengths of the propagating waves are equal to or shorter than the various external dimensions of the cutterhead.

In one specific and non-limiting example, cutterhead 10 provided a uniform stylus displacement response to within ± 1 dB over a frequency range of 2 to 300 KHz. A constant level signal voltage was applied to connections 38 and 40 and provided a signal responsive stylus-displacement of up to 10$\mu$ inches peak-to-peak. The stylus mount and truncated triangular pyramidal supporting pedestal had side slopes of 45° and angles at the base of the pyramid as shown in FIG. 2 of about 56° with an angle at the apex of the pyramid of 68°. The angles of the supporting pedestal, piezoelectric element and stylus mount were aligned as shown in FIG. 2. The stylus mount was formed of aluminum and the supporting pedestal was formed of cold rolled steel. The supporting pedestal was about 0.8 inches across the longest leg of the base, while the piezoelectric element and stylus mount were about 0.22 inches along the longest edge of the base. The resilient damping material between the supporting pedestal and the mounting bracket was two layers of 0.005 inch thick Kapton bonded together by Viscoloid or similar damping material. The triangular piezoelectric element was lead zirconium titanate having a thickness of 0.05 inches between its parallel surfaces. The height of the stylus mount was 0.05 inches and the height of the supporting pedestal was 0.15 inches. With a 500 volt RMS signal applied through the electrical leads of the cutterhead, a frequency response to up to 380 KHz was produced encountering resonant modes.

Although the cutterhead thus far has been described in terms of a substantially pyramidal shaped structure, other structures having antiparallel sides may provide satisfactory performance. For example, the cutterhead illustrated in FIGS. 1 and 2 may be formed in a substantially conical shape, with each of the constituent elements having a circular, rather than triangular cross section. Cutterheads formed in a substantially conical configuration may offer certain constructional advantages providing cost savings in production.

What is claimed is:

1. Apparatus for providing displacement of a cutting stylus in response to electrical signals and adapted for mounting to a bracket comprising:

(*1*) a pedestal having first and second opposing sides of different surface area;

(*2*) a cutting stylus; [a stylus mount having a base region and adapted for receiving said cutting stylus;]

(*3*) a piezoelectric element having first and second opposing sides, said first side of said *piezoelectric* element adjacent to and rigidly coupled to a first side of said pedestal [and said second side of said element adjacent to and rigidly coupled to said base region of said stylus mount,];

(*4*) *means for rigidly coupling said cutting stylus to said second side of said piezoelectric element;* said pedestal, *said* piezoelectric element, and [stylus mount] *said coupling means* forming a structure having all external surfaces disposed anti-parallel to each other;

(*5*) means for providing electrical signals to said piezoelectric element; and (*6*) means for mounting said second side of said pedestal on said bracket.

2. Apparatus according to claim 1 wherein:

said pedestal is made of material having a relatively high Young's modulus and a relatively high density.

3. Apparatus according to claim 2 wherein:

said pedestal of material having a high Young's modulus and high density is selected from the group of materials consisting of steel and tungsten.

4. Apparatus according to claim 1 *wherein said rigid coupling means comprises a stylus mount having a base region and adapted for receiving said cutting stylus, wherein said second side of said element is adjacent to and rigidly coupled to said base region of said stylus mount, and* wherein:

said stylus mount is made of material having a relatively high Young's modulus and a relatively low density.

5. Apparatus according to claim 4 wherein:

said stylus mount is selected from the group of materials having a high Young's modulus and low density consisting of aluminum, magnesium, beryllium and sapphire.

6. Apparatus according to claim 1 *wherein said rigid coupling means comprising a stylus mount having a base region and adapted for receiving said cutting stylus, wherein said second side of said element is adjacent to and rigidly coupled to said base region of said stylus mount, and* wherein:

said pedestal and *said* stylus mount are truncated triangular pyramids and said piezoelectric element is triangular in cross-section, with the pyramidal shapes tapering toward said cutting stylus from said bracket.

7. A video disc cutterhead according to claim 6 wherein:

said piezoelectric element is a truncated triangular pyramid tapering towards said stylus.

8. A video disc cutterhead according to claim 1 *wherein said rigid coupling means comprises a stylus mount having a base region and adapted for receiving said cutting stylus, wherein said second side of said element is adjacent to and rigidly coupled to said base region of said stylus mount, and* wherein:

said pedestal, *said* stylus mount and *said* piezoelectric element are truncated conicals, with the conical shapes tapering towards said stylus.

9. Apparatus according to claim 1 *wherein said rigid coupling means comprises a stylus mount having a base region and adapted for receiving said cutting stylus, wherein said second side of said element is adjacent to and rigidly coupled to said base region of said stylus mount, and* wherein:

said means for providing electrical signals to said piezoelectric element includes first and second wires respectively coupled to said pedestal and said stylus mount; and conductive cementing material interposed between adjacent sides of said piezoelectric element and said pedestal and said stylus mount.

10. Apparatus according to claim 1 *wherein said rigid coupling means comprises a stylus mount having a base region and adapted for receiving said cutting stylus, wherein said second side of said element is adjacent to and rigidly coupled to said base region of said stylus mount, and* wherein:

said means for mounting said second side of said pedestal on said bracket includes damping material interposed between said second side and said bracket, said damping material adapted for adhesively coupling said pedestal to said bracket.

11. Apparatus according to claim 10 wherein:

said pedestal and *said* stylus mount are truncated triangular pyramids and said piezoelectric element is triangular in cross-section, with the pyramidal shapes tapering toward said cutting stylus from said bracket.

12. Apparatus according to claim 11 wherein:

said stylus mount is made of material having a relatively high Young's modulus and a relatively low density.

13. Apparatus according to claim 12 wherein:

said pedestal is made of material having a relativey high Young's modulus and a relatively high density.

14. Apparatus according to claim 13 wherein:

said means for providing electrical signals to said piezoelectric element includes first and second wires respectively coupled to said pedestal and said stylus mount; and conductive cementing material interposed between adjacent sides of said piezoelectric element and said pedestal and said stylus mount.

* * * * *